(12) United States Patent
Parthasarathy et al.

(10) Patent No.: US 11,237,806 B2
(45) Date of Patent: Feb. 1, 2022

(54) MULTI OBJECTIVE OPTIMIZATION OF APPLICATIONS

(71) Applicant: International Business Machines Corporation, Armonk, NY (US)

(72) Inventors: Srinivasan Parthasarathy, White Plains, NY (US); Fabio A. Oliveira, Yorktown Heights, NY (US); Sushma Ravichandran, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 19 days.

(21) Appl. No.: 16/863,001

(22) Filed: Apr. 30, 2020

(65) Prior Publication Data

US 2021/0342132 A1 Nov. 4, 2021

(51) Int. Cl.
| | |
|---|---|
| *G06F 8/41* | (2018.01) |
| *G06F 11/34* | (2006.01) |
| *G06N 5/04* | (2006.01) |
| *G06N 20/00* | (2019.01) |
| *G06F 11/30* | (2006.01) |

(52) U.S. Cl.
CPC ............ *G06F 8/443* (2013.01); *G06F 11/302* (2013.01); *G06F 11/3409* (2013.01); *G06N 5/04* (2013.01); *G06N 20/00* (2019.01)

(58) Field of Classification Search
CPC ................................ G06F 8/443; G06N 20/00
USPC ................................................... 717/136–161
See application file for complete search history.

(56) References Cited

U.S. PATENT DOCUMENTS

| 7,664,622 | B2 | 2/2010 | Ruetsch |
| 9,147,164 | B2 | 9/2015 | Chester et al. |
| 2012/0233488 | A1 | 9/2012 | Burchard |
| 2013/0096899 | A1* | 4/2013 | Usadi ............... E21B 43/00 703/10 |
| 2017/0206500 | A1* | 7/2017 | Deshpande ........ G06Q 30/0635 |

(Continued)

FOREIGN PATENT DOCUMENTS

| WO | 2009022302 | 2/2009 |
| WO | 2017118488 | 7/2017 |

OTHER PUBLICATIONS

Deb, Kalyanmoy. "Multi-objective optimization." Search methodologies. Springer, Boston, MA, 2014. pp. 403-449. (Year: 2014).*

(Continued)

*Primary Examiner* — Satish Rampuria
(74) *Attorney, Agent, or Firm* — Lieberman & Brandsdorfer, LLC

(57) ABSTRACT

A system, computer program product, and method are provided for orchestrating a multi objective optimization of an application. A set of two or more key performance indicators (KPIs) and one or more parameters associated with the application are received. A machine learning (ML) based surrogate function learning model in combination with an acquisition function is leveraged to conduct one or more adaptive trials. Each trial consists of a specific configuration of the one or more parameters. A pareto surface of the KPIs of the application is computed based on the observations of KPI values from each adaptive trial. The pareto surface is explored and an optimal operating point is selected for the application. The application is then executed at the selected operating point.

20 Claims, 10 Drawing Sheets

(56) References Cited

U.S. PATENT DOCUMENTS

| | | | |
|---|---|---|---|
| 2018/0144277 A1 | 5/2018 | Srivastava | |
| 2018/0336493 A1* | 11/2018 | Hayes | G06N 99/00 |
| 2019/0129764 A1* | 5/2019 | Johnson | G06N 20/00 |
| 2019/0213475 A1* | 7/2019 | Erlandson | G06N 3/08 |
| 2019/0325335 A1* | 10/2019 | Chan | G06N 20/00 |

OTHER PUBLICATIONS

Coello, CA Coello. "Evolutionary multi-objective optimization: a historical view of the field." IEEE computational intelligence magazine 1.1 (2006): pp. 28-36. (Year: 2006).*

Liang, Jing J., C. T. Yue, and Bo-Yang Qu. "Multimodal multi-objective optimization: A preliminary study." 2016 IEEE Congress on Evolutionary Computation (CEC). IEEE, 2016.pp. 2451-2461 (Year: 2016).*

Meng, Pingfan, et al. "Adaptive threshold non-pareto elimination: Re-thinking machine learning for system level design space exploration on FPGAs." 2016 Design, Automation & Test in Europe Conference & Exhibition (DATE). IEEE, 2016.pp. 918-923 (Year: 2016).*

Wang, Jingjing, et al. "Thirty years of machine learning: The road to Pareto-optimal wireless networks." IEEE Communications Surveys & Tutorials 22.3 (2020): pp. 1472-1514. (Year: 2020).*

Jin, Yaochu, and Bernhard Sendhoff. "Pareto-based multiobjective machine learning: An overview and case studies." IEEE Transactions on Systems, Man, and Cybernetics, Part C (Applications and Reviews) 38.3 (2008): pp. 397-415. (Year: 2008).*

Liang et al., "Pareto surface construction for multi-objective optimization under uncertainty." Structural and Multidisciplinary Optimization 55.5 (2017): 1865-1882.

Everson et al., "Multi-class ROC analysis from a multi-objective optimisation perspective." Pattern Recognition Letters 27.8 (Jul. 11, 2013).

Bhatti et al. "Learning Distributed Deployment and Configuration Trade-Offs for Context-Aware Applications in Intelligent Environments." Journal of Ambient Intelligence and Smart Environments 6.5 (2014): 541-559.

Horn et al., "Multiobjective Optimization Using the Niched Pareto Genetic Algorithm." IlliGAL report 93005 (Jul. 1993).

Zitzler et al.,. "An evolutionary algorithm for multiobjective optimization: The strength Pareto approach." TIK-report 43 (1998).

Corne et al., "The Pareto Envelope-Based Selection Algorithm for Multiobjective Optimization." International conference on parallel problem solving from nature. Springer, Berlin, Heidelberg, 2000.

Weintraub, E. et al., "Mutli Objective Optimization of Cloud Computing Services for Consumers", (IJACSA) International Journal of Advanced Computer Science and Applications, vol. 8, No. 2 (2017).

Son, A-Young, et al., "Multi-Objective Optimization Method for Resource Scaling in Cloud Computing", In Proceedings of the 12th International Conference on Ubiquitous Information Management and Communication, Jan. 2018 (IMCOM '18).

Shrimali, B., et al., "Multi-objective optimization oriented policy for performance and energy efficient resource allocation in Cloud environment" Journal of King Saud University—Computer and Information Sciences, 2017.

Zhang, M., et al., "Multi-Objective Optimization Algorithm Based on Improved Particle Swarm in Cloud Computing Environment", Discrete and Continuous Dynamical Systems Series S, vol. 12, No. 4 & 5, Aug. & Sep. 2019, pp. 1413-1426.

Jahani, A., et al., "Cloud service ranking as a multi objective optimization problem", The Journal of Supercomputing, vol. 72, pp. 1897-1926, Mar. 9, 2016.

PCT/CN2021/091104 International Search Report and Written Opinion, dated Jul. 26, 2021.

* cited by examiner

MULTI OBJECTIVE OPTIMIZATION OF APPLICATIONS

BACKGROUND

The present embodiment(s) relate to executing an application at an optimal operating point with respect to specific key performance indicators. More specifically, the embodiments are directed at leveraging machine learning (ML) to compute a pareto surface, and exploration of the pareto surface for identification of the optimal operating point.

Cloud computing is a model for enabling ubiquitous, convenient, on-demand network access to a shared pool of configurable resources, e.g. networks, servers, storage, application, and services, that can be rapidly provisioned and released with minimal management effort or service provided interaction. An application, or more specifically a cloud application, is a software program where cloud-based and local components work together. This model relies on remote servers for processing logic that may be accessed through a web browser with a continual internet connection. Cloud application servers may be located in a remote data center. Cloud-based application tasks may encompass email, file storage and sharing, order entry, inventory management, word processing, customer relationship management, data collection, or financial accounting features.

Micro-services, also known as a micro-service architecture, is an architectural style that structures an application as a collection of services represented in one or more modular components that are highly maintainable and testable, loosely coupled, and independently deployable. Each module supports a specific task or business goal and uses a simple, well-defined interface, such as an application programming interface (API), to communicate with other sets of micro-services. Micro-services are small scalable components. Each module supports a specific task and uses a define interface, such as an application programming interface (API) to communicate with other services. Any separate micro-service module can be changed without affecting other parts of a program comprised of multiple micro-service modules. Accordingly, the micro-service architecture supports and enables scalability.

A monolithic architecture refers to a unified model for the design of a software application. Monolithic software is designed to be self-contained with components of the program interconnected and interdependent. In the monolithic architecture, each component and its associated components must be present in order for the code to be compiled or executed. If any program component needs to be updated to address anticipated and unanticipated changes within other elements, the entire application has to be re-written. Accordingly, the monolithic architecture is directed at a large, tightly coupled application.

It is understood in the art that micro-service architectures enhance business agility with faster software development and deployment compared to monolithic software architecture. More specifically, the micro-service architecture enables the rapid, frequent and reliable delivery of large, complex applications. With micro-services, individual services can be individually deployed or individually scaled. Done correctly, micro-services require less infra-structure than monolithic applications because they enable precise scaling of only required components, instead of an entire application in the case of monolithic applications. It is understood in that are that there are challenges directed at micro-services, and more specifically micro-service architecture. Such challenges are directed at managing micro-services as the quantity of micro-services increases, monitoring micro-services, testing, dependencies, etc.

SUMMARY

The embodiments include a system, computer program product, and method for multi objective optimization of cloud applications with respect to key performance indicators.

In one aspect, a computer system is provided with a processing unit operatively coupled to a memory, and an artificial intelligence (AI) platform operatively coupled to the processing unit and memory. The AI platform is configured with tools in the form of an input manager, a trial manager, and an optimization manager configured with functionality to orchestrate a multi objective optimization of applications. The input manager is configured to receive a set of two or more key performance indicators (KPIs) associated with an application. The trial manager is operatively coupled to the input manager, and is configured to leverage a machine learning (ML) based surrogate function learning model in combination with an acquisition function to conduct an adaptive trial execution of the application with one or more received parameters. The trial manager is further configured to compute a pareto surface of the KPIs of the application based on observed output from the trial execution(s). The optimization manager, which is operatively coupled to the trial manager, functions to explore the computed pareto surface and select an optimal operating point for the application. The optimal operating point corresponds to the configuration of the one or more parameters. The optimization manager executes the application at the selected optimal operating point.

In another aspect, a computer program product is provided to orchestrate a multi objective optimization of an application. The computer program product is provided with a computer readable storage device having embodied program code. The program code is executable by the processing unit with functionality to receive a set of two or more key performance indicators (KPIs) associated with an application. The program code leverages a machine learning (ML) based surrogate function learning model in combination with an acquisition function to conduct an adaptive trial execution of the application with one or more received parameters. The program code computes a pareto surface of the KPIs of the application based on observed output from the trial execution(s). The program code explores the computed pareto surface and selects an optimal operating point for the application, with the optimal operating point corresponding to configuration of the one or more parameters. The program code further functions to execute the application at the selected optimal operating point.

In yet another aspect, a method is provided for orchestrating a multi objective optimization of an application. A set of two or more key performance indicators (KPIs) associated with an application are received. A machine learning (ML) based surrogate function learning model in combination with an acquisition function is leveraged to conduct an adaptive trial execution of the application with one or more received parameters. A pareto surface of the KPIs of the application based is computed based on observed output from the trial execution(s). The computed pareto surface is explored and an optimal operating point is selected for the application based on the exploration, with the optimal operating point corresponding to configuration of the one or more parameters. The application is then executed at the selected optimal operating point.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings referenced herein form a part of the specification and are incorporated herein. Features shown in the drawings are meant as illustrative of only some embodiments, and not of all embodiments, unless otherwise explicitly indicated.

DETAILED DESCRIPTION

Figure 1:
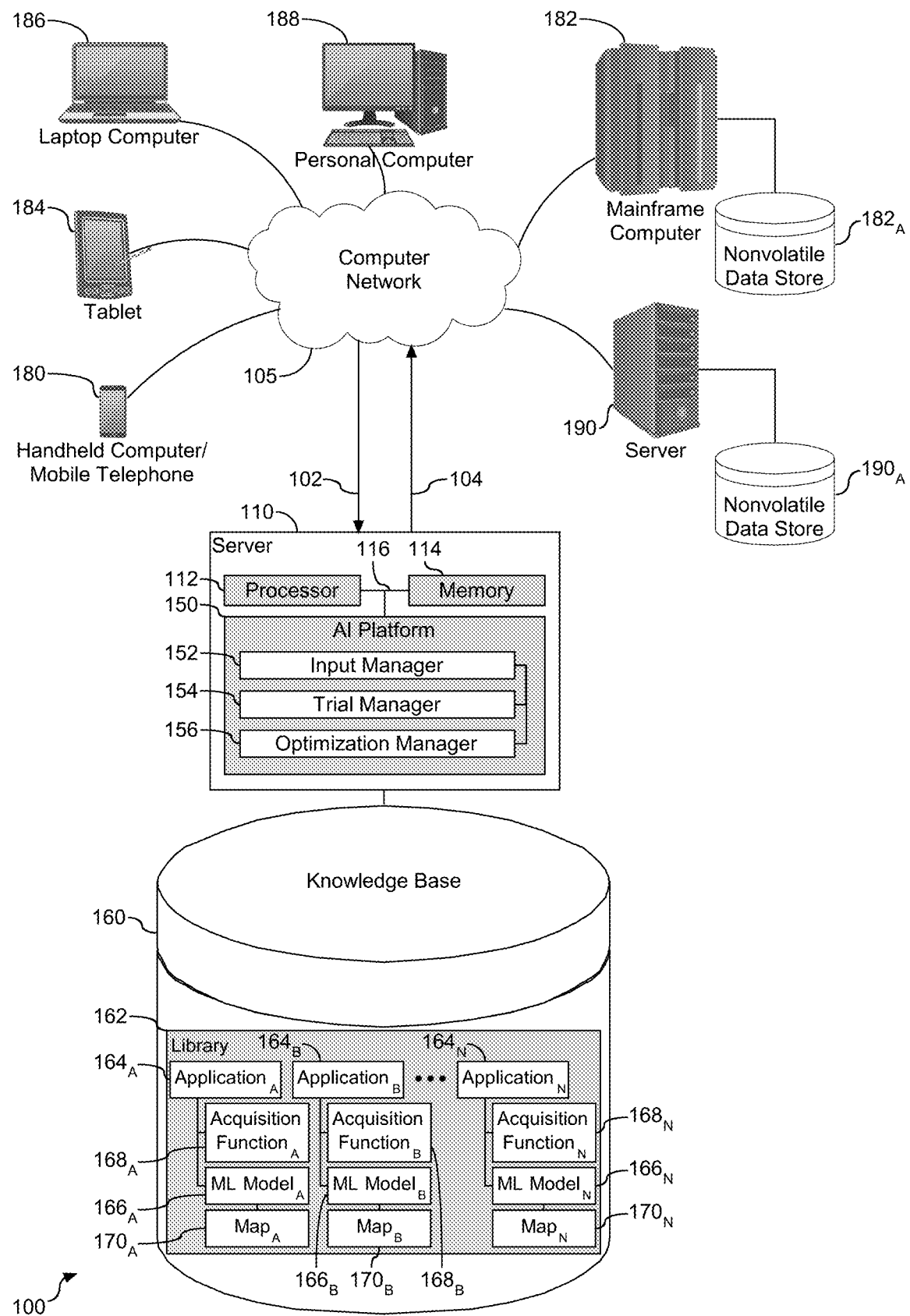
FIG. 1 depicts a system diagram illustrating a computer system and embedded tools to support multi objective optimization of applications.

It will be readily understood that the components of the present embodiments, as generally described and illustrated in the Figures herein, may be arranged and designed in a wide variety of different configurations. Thus, the following detailed description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiments. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

Artificial Intelligence (AI) relates to the field of computer science directed at computers and computer behavior as related to humans. AI refers to the intelligence when machines, based on information, are able to make decisions, which, for example, improves or maximizes the chance of success in a given topic. More specifically, AI is able to learn from a data set to solve problems and provide relevant recommendations. For example, in the field of artificial intelligent computer systems, natural language systems (such as the IBM Watson® artificially intelligent computer system or other natural language interrogatory answering systems) process natural language based on system acquired knowledge. To process natural language, the system may be trained with data derived from a database or corpus of knowledge, but the resulting outcome can be incorrect or inaccurate for a variety of reasons.

At the core of AI and associated reasoning lies the concept of similarity. The process of understanding natural language and objects requires reasoning from a relational perspective that can be challenging. Structures, including static structures and dynamic structures, dictate a determined output or action for a given determinate input. More specifically, the determined output or action is based on an express or inherent relationship within the structure. This arrangement may be satisfactory for select circumstances and conditions. However, it is understood that dynamic structures are inherently subject to change, and the output or action may be subject to change accordingly.

Machine learning (ML), which as noted above is a sub-set of AI, utilizes algorithms to learn from data, rather than through explicit programming, and create foresights based on this data. ML is the application of AI through creation of neural networks that can demonstrate learning behavior by performing tasks that are not explicitly programmed. ML requires data that is analyzed, formatted and conditioned to build a machine learning model and to train a machine learning algorithm. It is understood in the art that a ML algorithm is a computerized procedure and when trained on the data, generates a ML model. Selecting the ML algorithm is essential to successfully applying ML. Examples of ML include, but are not limited to, regression algorithms, decision trees, instance-based algorithms, and clustering algorithms. Once the data is prepared and the algorithm is trained, the ML model can make determinations or predictions about the data. The greater the quantity of data provided, the more the model learns and improves accuracy of its predictions.

ML models fall into the following basic categories: supervised machine learning, unsupervised machine learning, reinforcement machine learning, and deep learning. Supervised learning algorithms learn a mapping function for a data set with an existing classification, where unsupervised learning algorithms can categorize an unlabeled data set based on some hidden features in the data. Reinforcement learning can learn policies for decision-making in an uncertain environment through iterative exploration of that environment. Deep learning incorporates neural networks in successive layers to learn from data in an iterative manner. Neural networks are models of the way the nervous system operates. Basic units are referred to as neurons, which are typically organized into layers. The neural network works by simulating a large number of interconnected processing units that resemble abstract versions of neurons. There are typically three parts in a neural network, including an input layer, with units representing input fields, one or more hidden layers, and an output layer, with a unit or units representing target field(s). The units are connected with varying connection strengths or weights. Input data are presented to the first layer, and values are propagated from each neuron to every neuron in the next layer. Eventually, a result is delivered from the output layers. Deep learning complex neural networks are designed to emulate how the human brain works, so computers can be trained to support poorly defined abstractions and problems. Neural networks and deep learning are often used in image recognition, speech, and computer vision applications.

An intelligent system, computer program product, and method are provided herein with tools and algorithms to run intelligent real-time analytics using Machine Learning (ML). More specifically, and as shown and described herein, ML is applied to the micro-service architecture to facilitate multi-objective optimization of applications, including for example cloud applications. Different avenues are available to parameterize cloud applications, with configuration of such parameters yielding different values of key performance indicators (KPIs) for the applications.

Latency is a networking term directed at a time interval or delay when a system component is waiting for another system component to response. The duration of the time interval is called latency. Timeout is directed at an interrupt signal generated by a program or device that has waited a certain length of time for some input but has not received it. Many programs perform timeouts so that the program does not sit idle waiting for input that may never arrive. Setting timeout and retry values of micro-services can yield distinct values of end-to-end latency and error rates for the application(s), e.g. the cloud application(s). It is desirable to be able to determine the best tradeoff between KPIs, such as latency verse error rate for a given application, before the application is executed. In an embodiment, determining these tradeoffs allows for the realistic evaluation of service level agreements (SLAs) associated with the given application. Analysis of the tradeoff is complicated, and in one embodiment proportional to the architectural structure of micro-services in cloud applications.

Referring to FIG. 1, a computer system (100) is provided with tools to support multi-objective optimization of applications. As shown, a server (110) is provided in communication with a plurality of computing devices (180), (182), (184), (186), (188), and (190) across a network connection (105). The server (110) is configured with a processing unit, e.g. processor, (112) operatively coupled to memory (114) across a bus (116). A tool in the form of an artificial intelligence (AI) platform (150) is shown local to the server (110), and operatively coupled to the processing unit (112) and memory (114). As shown, the AI platform (150) contains one or more tools in the form of an input manager (152), a trial manager (154), and an optimization manager (156) to provide and support multi-objective optimization of applications over the network (105) from one or more computing devices (180), (182), (184), (186), (188), and (190). More specifically, the computing devices (180), (182), (184), (186), (188), and (190) communicate with each other and with other devices or components via one or more wires and/or wireless data communication links, where each communication link may comprise one or more of wires, routers, switches, transmitters, receivers, or the like. In this networked arrangement, the server (110) and the network connection (105) enable optimization of a cloud application across distributed resources. Other embodiments of the server (110) may be used with components, systems, subsystems, and/or devices other than those that are depicted herein.

The AI platform (150) is shown herein configured with tools to support ML, and more specifically a ML based surrogate function learning model in combination with an acquisition function, to facilitate and enable the cloud application optimization. The tools embedded herein including the input manager (152), the trial manager (154), and the optimization manager (156) are configured to receive input from various sources, including but not limited to input from the network (105), and an operatively coupled knowledge base (160). In an embodiment, the knowledge base (160) is configured with library (162) with a plurality of applications, shown herein by way of example as application$_A$ (164$_A$), application$_B$ (164$_B$), and application$_N$ (164$_N$). Although only three applications are shown, this quantity is for illustrative purposes and should not be considered limiting. In an embodiment, the knowledge base (160) may be configured with one or more additional libraries, each having one or more applications. The quantity of applications in the structure or library (162) is for illustrative purposes and should not be considered limiting.

Each application is shown herein with a machine learning (ML) surrogate function, referred to herein as a ML Model. Application$_A$ (164$_A$) is shown having ML Model$_A$ (166$_A$), application$_B$ (164$_B$) is shown having ML Model$_B$ (166$_B$), and application$_N$ (164$_N$) is shown having ML Model$_N$ (166$_N$). Each ML Model is shown herein with a corresponding model map, also referred to herein as a map. For descriptive purposes ML Model$_A$ (166$_A$) is shown with corresponding model map$_A$ (170$_A$), ML Model$_B$ (166$_B$) is shown with corresponding model map$_B$(170$_B$), and ML Model$_N$ (166$_N$) is shown with corresponding model map$_N$ (170$_N$). Furthermore, each existing application may also have a corresponding acquisition function, directed at sampling, and more specifically at measuring a value that would be generated. Application$_A$ (164$_A$) is shown having acquisition function$_A$ (168$_A$), application$_B$ (164$_B$) is shown having acquisition function$_B$ (168$_B$), and application$_N$ (164$_N$) is shown having acquisition function$_N$(168$_N$). Details of how the ML surrogate function, corresponding model map, and acquisition function are utilized are shown and described in detail below.

The various computing devices (180), (182), (184), (186), (188), and (190) in communication with the network (105) demonstrate access points to the AI platform (150). The tools (152), (154), and (156) support and enable multi-objective optimization of applications. The network (105) may include local network connections and remote connections in various embodiments, such that the AI platform (150) and the embedded tools (152), (154), and (156) may operate in environments of any size, including local and global, e.g. the Internet. Accordingly, the server (110) and the AI platform (150) serve as a front-end system, with the knowledge base (160) and applications(s) (164$_A$)-(164$_N$) serving as a back-end system.

As described in detail below, the AI platform (150) optimizes performance of applications, where the application is a collection of micro-services, with respect to identified key performance indicators (KPIs). The AI platform (150) utilizes the input manager (152) to receive a set of two or more KPIs associated with an application. The KPIs indicate performance aspects of the application that is the subject of optimization. In an embodiment, the category of KPIs is user selected and pertains to performance aspects that the user is interested in optimizing. Each KPI in the set of received KPIs has an associated or corresponding indicator type. Examples of possible KPI types include quantitative and qualitative indicators. A quantitative indicator indicates a quantity, which in an embodiment may be a number, an index, a ratio, percentage, etc. Qualitative indicators do not show numeric measures. Rather, they depict a status in quality. Examples of types of quantitative measures that measure application performance include, but are not limited to, latency, error rate, and throughput. Each quantitative indicator has one or more corresponding values.

It is understood in the art with respect to an application as a collection of services, e.g. micro-services, that such services may not be arranged linearly. Rather, it is understood that the micro-services may include dependencies, and as such the micro-services have a hierarchical arrangement to reflect such dependencies. In addition to the KPIs, the input manager (152) also receives one or more parameters that are associated with the application, with each parameter being associated with a parameter value. Examples of possible parameter values include, but are not limited to, timeout, retry, and replication count associated with one or more topological constraints corresponding to the hierarchical arrangement, e.g. hierarchy. It is understood in the art that a hierarchy is an organization technique in which items are layered or grouped to reduce complexity. Examples of hierarchical arrangements of micro-services are shown and described in FIGS. 6-8. The tunable parameter(s) are set with respect to the hierarchy of micro-services ensuring the parameter value(s) guarantee any queries from a parent micro-service are active as long as a query from a child micro-service is active.

The trial manager (154), which is shown herein operatively coupled to the input manager (152), functions within the AI platform (150) to monitor a dynamic resource state. More specifically, the trial manager (154) leverages the ML based surrogate function learning model in combination with the acquisition function to conduct one or more adaptive trials of the application. As shown in the knowledge base (160), each application has a corresponding surrogate function and acquisition function. Each trial is directed at a specific configuration of the application based on the parameter(s) setting(s). The trial manager (154) leverages the acquisition function$_A$ (168$_A$) to select a configuration of the one or more parameters for an adaptive trial run of the application$_A$ (164$_A$). The results of the adaptive trial provide performance indicator values of the application, e.g. KPIs, associated with the specific configuration of the parameter(s). In addition, the trial manager (154) leverages the ML surrogate function to capture the KPI values in the associated ML Model. The ML based surrogate function learning model can be implemented using a neural network, Gaussian Progress regression, or other linear, or non-linear or kernel regression techniques, or other value estimation techniques used in black-box optimization or reinforcement learning. Accordingly, the ML models maps each configuration of one or more parameters to two or more corresponding KPI values.

Multiple trials of the application may be conducted through parameter value setting. The acquisition function, acquisition function$_A$ (168$_A$), selects a new configuration of the one or more parameter values and another adaptive trial and corresponding KPI values are measured. The acquisition function can be implemented as an expected improvement function, maximum probability of improvement function, or upper confidence bound function, or other action estimation techniques used in black-box optimization or reinforcement learning. The trial manager (154) uses the KPI values from each trial and computes a pareto surface of the application. The pareto surface graphically exhibits all of the possible KPI values that can be achieved based on the configurations of the parameter values that were employed in the adaptive trials. Accordingly, the trial manager (154) leverages the ML surrogate function learning model and the acquisition function to run adaptive trials of the application based on selected configurations of the tunable parameters, and uses the KPI values from the trials to compute a corresponding pareto surface.

The optimization manager (156), which is shown herein operatively coupled to the input manager (152) and the trial manager (154), functions to explore the pareto surface computed by the trial manager (154) to find an optimal operating point of the application, and to execute the application at the selected operating point. The optimization manager (156) explores the computed pareto surface and from this exploration selects an optimal operating point, also referred to herein as the operating point, for the application. In an embodiment, the selected operating point represents a trade off in KPI values, where the point selected might have a higher value for a first, more desirable KPI, and a lower value for a second, less desirable KPJ. In an embodiment, the operating point may be selected by the user. The optimization manager (156) executes the application using the selected operating point. By using the selected operating point, the application executes with the desired KPI values as specified by the user. Accordingly, the optimization manager (156) explores the computed pareto surface and selects an optimal operating point for the application, and then executes that application using the selected operating point.

Though shown as being embodied in or integrated with the server (110), the AI platform (150) may be implemented in a separate computing system (e.g., 190) that is connected across the network (105) to the server (110). Although shown local to the server (110), the tools (152), (154), and (156) may be collectively or individually distributed across the network (105). Wherever embodied, the input manager (152), trial manager (154), and optimization manager (156) are utilized to manage and support multi objective optimization of applications.

Applications may be communicated to the server (110) across the network (105). For example, in an embodiment, one or more applications may be communicated to the server (110) from nonvolatile data store (190$_A$). The tools (152), (154), and (156) process the applications, whether from the knowledge base (160) or across the network (105).

Types of information handling systems that can utilize server (110) range from small handheld devices, such as a handheld computer/mobile telephone (180) to large mainframe systems, such as a mainframe computer (182). Examples of a handheld computer (180) include personal digital assistants (PDAs), personal entertainment devices, such as MP4 players, portable televisions, and compact disc players. Other examples of information handling systems include a pen or tablet computer (184), a laptop or notebook computer (186), a personal computer system (188) and a server (190). As shown, the various information handling systems can be networked together using computer network (105). Types of computer network (105) that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems may use separate nonvolatile data stores (e.g., server (190) utilizes nonvolatile data store (190$_A$), and mainframe computer (182) utilizes nonvolatile data store (182$_A$). The nonvolatile data store (182$_A$) can be a component that is external to the various information handling systems or can be internal to one of the information handling systems.

An information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

Figure 2:
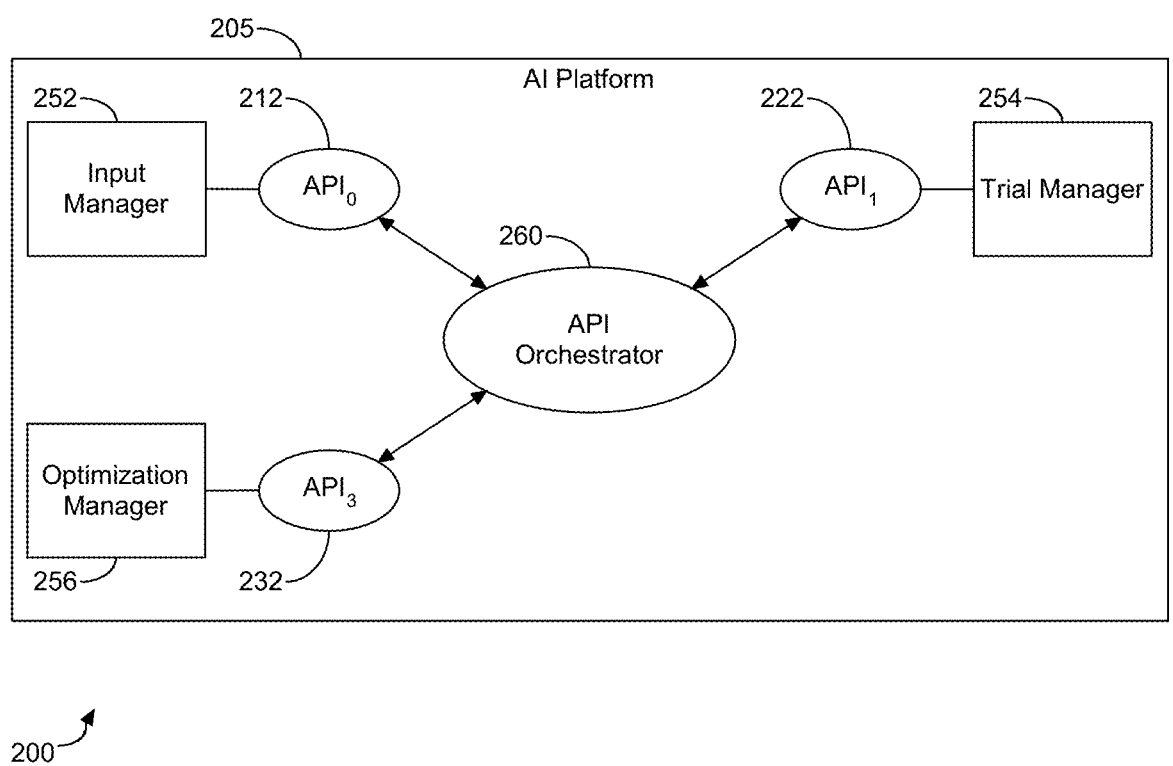
FIG. 2 depicts a block diagram illustrating the tools shown in FIG. 1 and their associated Application Program Interface(s).

An Application Program Interface (API) is understood in the art as a software intermediary between two or more applications. With respect to the application optimization system shown and described in FIG. 1, one or more APIs may be utilized to support one or more of the AI platform tools, including the input manager (152), the trial manager (154), and the optimization manager (156), and their associated functionality. Referring to FIG. 2, a block diagram (200) is provided illustrating the AI platform tools and their associated APIs. As shown, a plurality of tools are embedded within the AI platform (205), with the tools including the input manager (252) associated with API$_0$ (212), the trial manager (254) associated with API$_1$ (222), and the optimization manager (256) associated with API$_2$ (232). Each of the APIs may be implemented in one or more languages and interface specifications. API$_0$ (212) provides support for receipt and management of the selected KPIs and tunable parameters; API$_1$ (222) provides support for conducting one or more adaptive application trials and computing a corresponding pareto surface using the observed KPIs from the trials; and API$_2$ (232) provides support for exploring the pareto surface, including selection of an optimal application operating point and execution of the application at the selected operating point. As shown, each of the APIs (212), (222), and (232) are operatively coupled to an API orchestrator (260), otherwise known as an orchestration layer, which is understood in the art to function as an abstraction layer to transparently thread together the separate APIs. In an embodiment, the functionality of the separate APIs may be joined or combined. As such, the configuration of the APIs shown herein should not be considered limiting. Accordingly, as shown herein, the functionality of the tools may be embodied or supported by their respective APIs.

Figure 3:
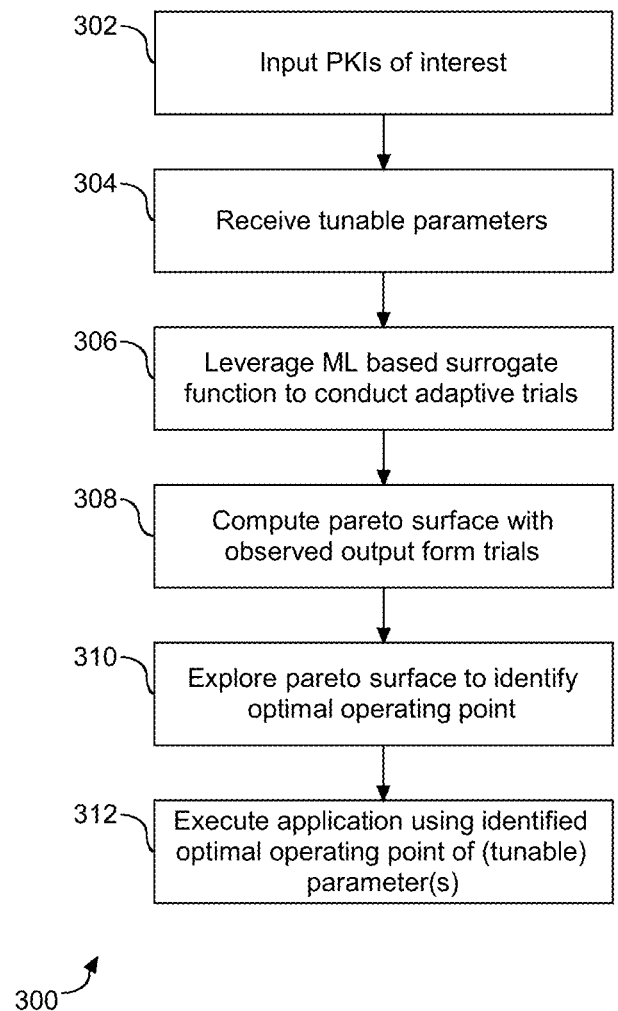
FIG. 3 depicts a flow chart illustrating a process for multi objective optimization of an application.

Referring to FIG. 3, a flow chart (300) is provided illustrating a process for multi objective optimization of an application. As shown and described, A user inputs two or more key performance indicators (KPIs) of interest with respect to an application (302), which in one embodiment may be a cloud based application. In an embodiment, a KPI is a metric that measures and assesses how well a process or project is meeting certain expectations and goals. KPIs can be incorporated into cloud applications to monitor and confirm expectations direction at the form and function of that the cloud application. Following step (302), one or more parameters associated with the application are received (304). The parameters received at step (304) are tunable parameters, and in an embodiment the received parameters are controllable, that affect the KPIs that were input at step (302). Examples of the received parameters include, but are not limited to, timeout, retry, and replication count associated with one or more topological constraints of the application. Accordingly, KPIs of interest and parameters associated with the application are received.

Figure 6:
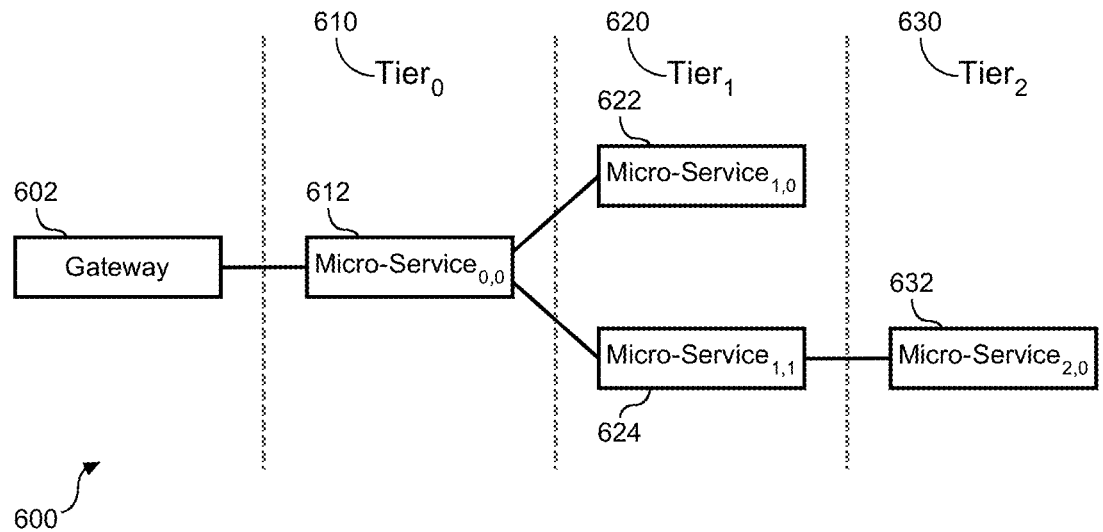
FIG. 6 is a block diagram depicting an example hierarchy of interacting micro-services.
Figure 7:
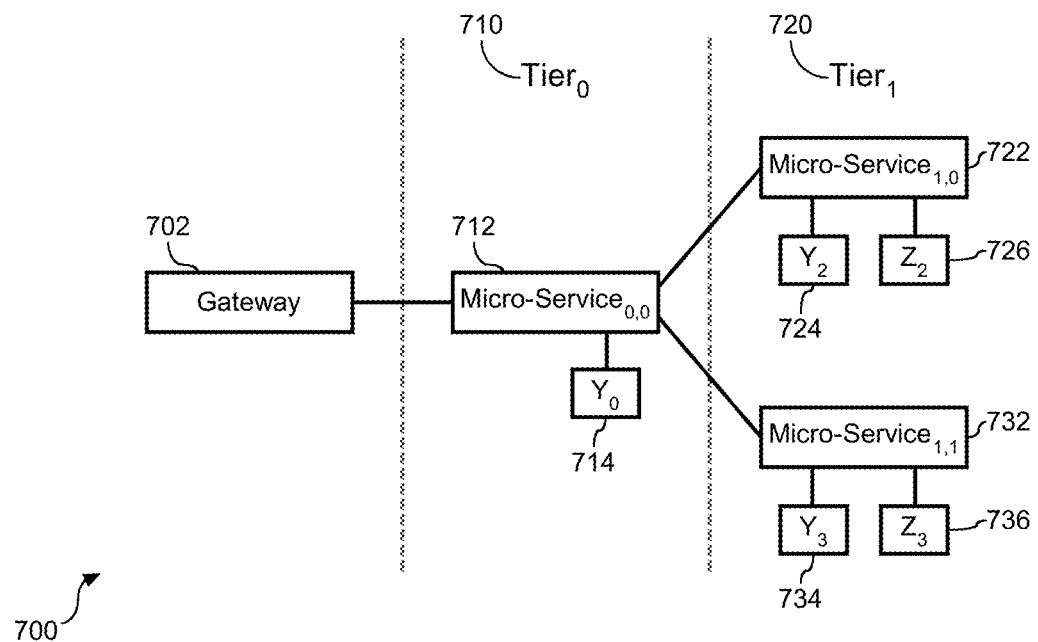
FIG. 7 is a block diagram depicting an example hierarchy of application micro-services with a sequential query constraint.
Figure 8:
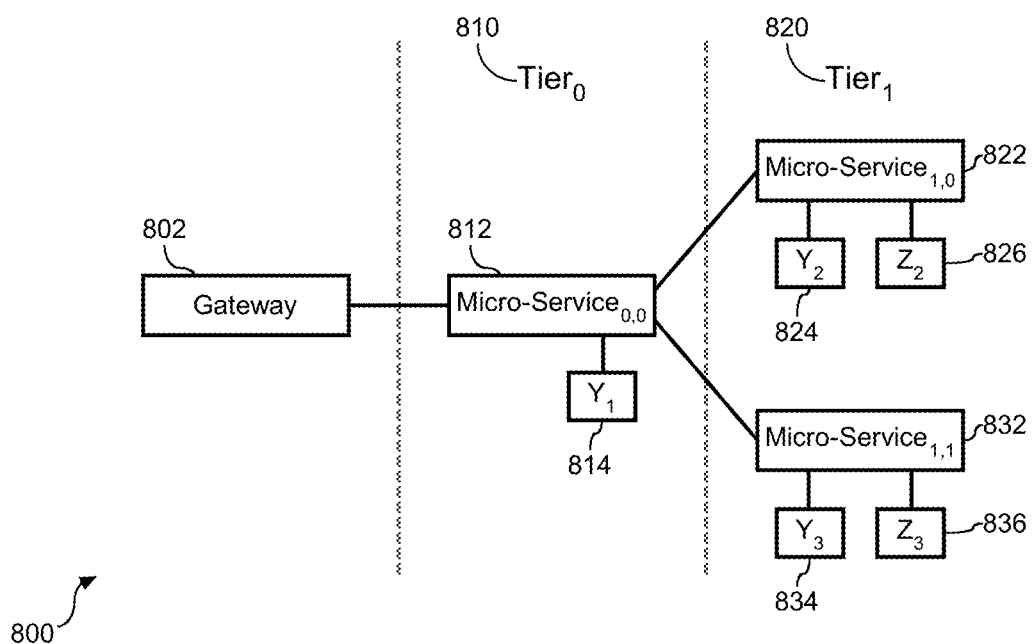
FIG. 8 is a block diagram depicting an example hierarchy of application micro-services with a parallel query constraint.

As described in FIG. 1, and as shown and described in FIGS. 6-8, the application is comprised of topological arrangement of micro-services, which in an embodiment includes a hierarchical arrangement of the micro-services. The hierarchical arrangement has inherent constraints directed at to the topology represented in the hierarchy. The parameters received at step (304) are responsive to the topology, and in an embodiment are tuned or set with respect to the hierarchy of micro-services that comprise the application ensuring that the parameter value(s) guarantee queries from a parent micro-service are active as long as a query from a child, e.g. dependent, micro-service is active. Following receipt of the parameter(s) at step (306), the ML based surrogate function associated with the application is leveraged in combination with a corresponding acquisition function to conduct one or more adaptive application performance trials to measure KPI values that correspond to the category of indicators designated at step (302), with the measured KPI values corresponding to possible KPI values that can be achieved based on the configurations of the parameter values received at step (304).

Figure 4:
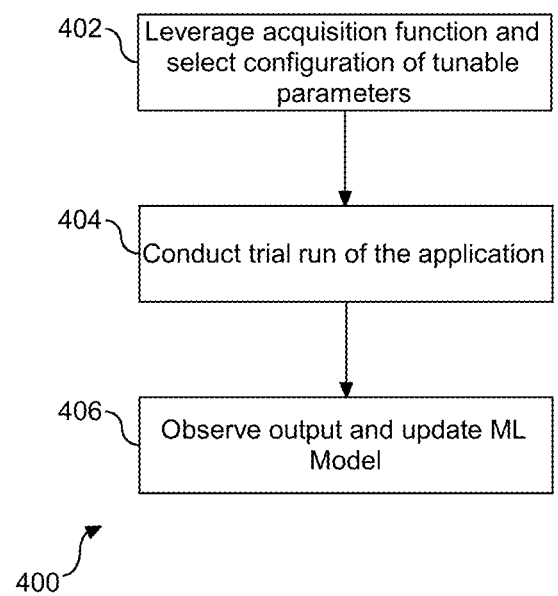
FIG. 4 depicts a flow chart illustrating a process for leveraging machine learning to conduct one or more adaptive trials.

Referring to FIG. 4, a flow chart (400) is provided illustrating a process for leveraging ML to conduct the application adaptive trials. As shown the acquisition function is leveraged and a configuration of the one or more tunable parameters, e.g. the tunable parameters received at step (304), is selected (402). In an embodiment, the selection at step (402) is directed at parameters that have not been previously utilized. A trial of the application is conducted with the selected application parameter(s) (404). Output from the trial is observed in the form of KPI values, and the ML model is updated with the parameter modification and the observed output (406). This process of parameter selection and KPI measurement will continue for a predetermined amount of time or a defined quantity of trials. In an embodiment, the time or quantity limitations are configurable. For example, in an embodiment, parameter configuration trials may be configured to be assessed for a quantity of time, e.g. 30 minutes. Accordingly, a ML surrogate function and acquisition function are leveraged to determine the quantitative output associated with the KPIs at different configurations of the one or more parameters.

Each trial of the application produces a quantitative performance value associated with the KPIs of interest. Following the conclusion of the adaptive trials as shown in FIG. 4, the process returns to step (308), where the observed quantitative output of the KPI values are utilized to compute a pareto surface. A pareto efficiency is a situation that cannot be modified so as to make any one individual or preference criterion better off without making at least one individual or preference criterion worse off. A pareto front, or a pareto surface, is the set of all of the pareto efficient allocations, conventionally shown graphically. The pareto surface created at step (308) shows all of the possible quantitative KPI values measured from the application trials that can be achieved based on the provided, and in one embodiment tunable, parameter(s). The created pareto surface is subject to exploration to identify an optimal operating point for the application (310). The application is then subject to execution using the identification optimal application operating point (312). Accordingly, as shown herein, application parameters are selected or tuned based on the topological arrangement of the application micro-services, ML leverages the application parameters to conduct adaptive application trials and compute a corresponding pareto surface, which is explored to identify and execute the application at an optimal operating point.

Figure 5:
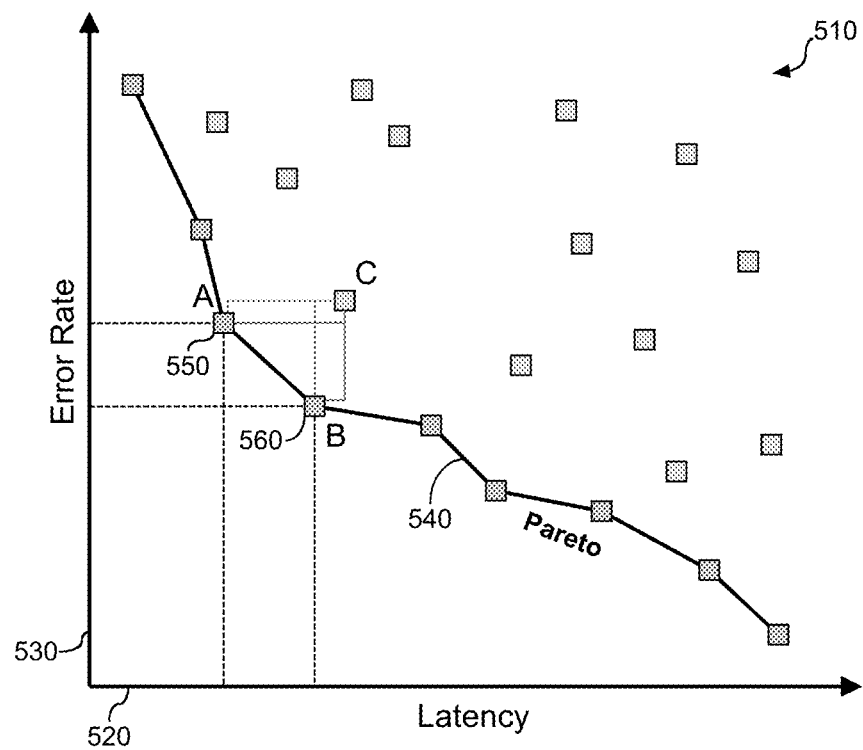
FIG. 5 depicts a block diagram illustrating a graph and an example pareto surface for the KPIs of latency and error rate objectives.

Referring to FIG. 5, a figure (500) is provided illustrating a graph and an example pareto surface for the KPIs of latency and error rate objectives. As shown, a graph (510) depicting two KPIs of latency and error rate are shown. The graph (510) is shown with the latency indicator measured on a first axis (520) and the error rate indicator measured on a second axis (530). Application trials are conducted with selected parameter(s) and quantitative values associated with the indicators are measured, with these measurements depicted in the graph (510). Each measurement is reflected with an entry in the graph (510). A plurality of KPI measurements is shown as entries in the graph (510) from the trials, and a pareto surface (540) is created to represent a select subset of the entries. Each graphical entry depicts the values of the selected KPIs, in this example latency and error rate, based on the provided tunable parameters (not shown). Any point on the pareto surface is a possible operating point of the application with corresponding and known (or identifiable) KPI values. For example, two possible or optimal operating points are shown on the pareto surface as operating point$_A$ (550) and operating point$_B$ (560). Operating point$_A$ (550) represents an optimal operating point of the application on the surface (540) with respect to latency, and operating point$_B$ (560) represents an optimal operating point of the application on the surface (540) with respect to error rate. Selecting an operating point along the pareto surface (540) dictates the application performance indicators before executing the application.

The graph shown in FIG. 5 is a two-dimensional pareto surface corresponding to two KPIs. It is understood that in an embodiment, the pareto surface may represent a larger quantity of KPIs. For example, in the case of three KPIs, the pareto surface would be a three dimensional surface. Accordingly, the pareto surface shown in FIG. 5 is a merely an example pareto surface from the application trials.

As described above in FIG. 1, the micro-services may have a hierarchical arrangement. The tunable parameter(s) are set with respect to the hierarchy of micro-services ensuring the parameter value(s) guarantee any queries from a parent micro-service are active as long as a query from a child micro-service is active. Referring to FIG. 6, a block diagram (600) is provided depicting an example hierarchy of interacting micro-services. A gateway (602) is shown in communication with a hierarchy of micro-services. The topology shown in the hierarchy includes three tiers, shown herein as tier$_0$ (610), tier$_1$ (620), and tier$_2$ (630). In an embodiment, tier$_0$ (610) is a parent layer, tier$_1$ (620) is a child layer, and tier$_2$ (630) is a grand-child layer. Tier$_0$ (610) is shown with a single micro-service, e.g. micro-service$_{0,0}$ (612). In an embodiment, micro-service$_{0,0}$ (612) is referred to as a parent micro-service which will stay active as long as a query from a child micro-service is active. Micro-service$_{1,0}$ (622) and micro-service$_{1,1}$ (624) are shown in the child tier, e.g. tier$_1$ (620) in the hierarchy. Micro-service$_{1,0}$ (622) and micro-service$_{1,1}$ (624) are referred to as child micro-services, each separately related and dependent on the parent micro-service$_{0,0}$ (612). A micro-service can be both a parent and child micro-service in the hierarchy. As shown, micro-service$_{1,1}$ (624) is both a dependent on micro-service$_{0,0}$ (612) and also a parent to micro-service$_{2,0}$ (632) in tier$_2$ (630). Based on the hierarchy and arrangement shown herein, micro-service$_{1,1}$ (624) will only stay active as long as a query from micro-service$_{2,0}$ (632) is active. Accordingly, the hierarchical arrangement of micro-services shown herein illustrates an example of dependent relationships among the micro-services.

FIG. 7 is a block diagram (700) depicting an example hierarchy of application micro-services with a sequential query constraint. A gateway (702) is shown in communication with a hierarchy of micro-services. The topology shown in the hierarchy includes two tiers, shown herein as tier$_0$ (710) and tier$_1$ (720). In an embodiment, tier$_0$ (710) is a parent layer, also referred to as an independent layer, and tier$_1$ (720) is a child layer, also referred to as a dependent layer. Tier$_0$ (710) is shown with a single micro-service, also referred to as a parent micro-service, micro-service$_{0,0}$ (712). Tier$_1$ (720) is shown with two child micro-services, including micro-service$_{1,0}$ (722) and micro-service$_{1,1}$ (732). Each child micro-service (722) and (732) is separately and directly related to the parent micro-service (712). Parent micro-service$_{0,0}$ (712) is configured with the timeout parameter, $y_0$ (714). Similarly, each of the child micro-services (722) and (732) is configured with a corresponding timeout parameter and a retry parameter. As shown, micro-service$_{1,0}$ (722) is shown with timeout parameter, $y_2$ (724) and retry parameter, $z_2$ (726), and micro-service$_{1,1}$ (732) is shown with timeout parameter, $y_3$ (734) and retry parameter, $z_3$ (736). The topological constraint for the hierarchy shown herein is a sequential query scenario shown as the equation $y_1 \geq y_2 z_2 + y_3 z_3$. Under this sequential query scenario the parent micro-service$_{0,0}$ (712) should not timeout when either of child micro-service$_{1,0}$ (722) or child micro-service$_{1,1}$ (732) are active.

FIG. 8 is a block diagram (800) depicting an example hierarchy of application micro-services with a parallel query constraint. As gateway (802) is shown in communication with a hierarchy of micro-services, with the hierarchy including two tiers of micro-services. A parent micro-service, micro-service$_{0,0}$ (812) is shown in a first tier (810), e.g. tier$_0$, and interfaces between the gateway (802) and the micro-services represented in a second tier (820), e.g. tier$_1$, also referred to as a child tier. Tier$_1$ (820) is shown with two child micro-services, each directly and separately corresponding to parent micro-service$_{0,0}$ (812). Child micro-service$_{1,0}$ (822) is directly related to parent micro-service$_{0,0}$ (812) and child micro-service$_{1,1}$ (832) is directly related to parent micro-service$_{0,0}$ (812). Parent micro-service$_{0,0}$ (812) is configured with the timeout parameter $y_1$ (814). Similarly, child micro-service$_{1,0}$ (822) is configured with timeout parameter being $y_2$ (824) and retry parameter $z_2$ (826), and micro-service$_{1,1}$ (832) is configured with timeout parameter $y_3$ (834) and retry parameter $z_3$ (836). The topological constraint for the hierarchy shown herein is a parallel query scenario shown as the equation $y_1 \geq \max\{y_2 z_2, y_3 z_3\}$. Under this parallel query scenario the micro-service$_{0,0}$ (812) should not timeout when either of child micro-service$_{1,0}$ (822) or child micro-service$_{1,1}$ (832) are active.

The hierarchical arrangements and corresponding sequential and parallel query scenarios shown and described in FIGS. 6, 7, and 8 are examples for illustrative purposes and should not be considered limiting. More specifically, the hierarchical arrangements shown herein are directed at examples of topological constraints responsive to the arrangement. In an embodiment, the quantity of micro-services, topological arrangement, and query scenarios may grow in complexity.

Figure 9:
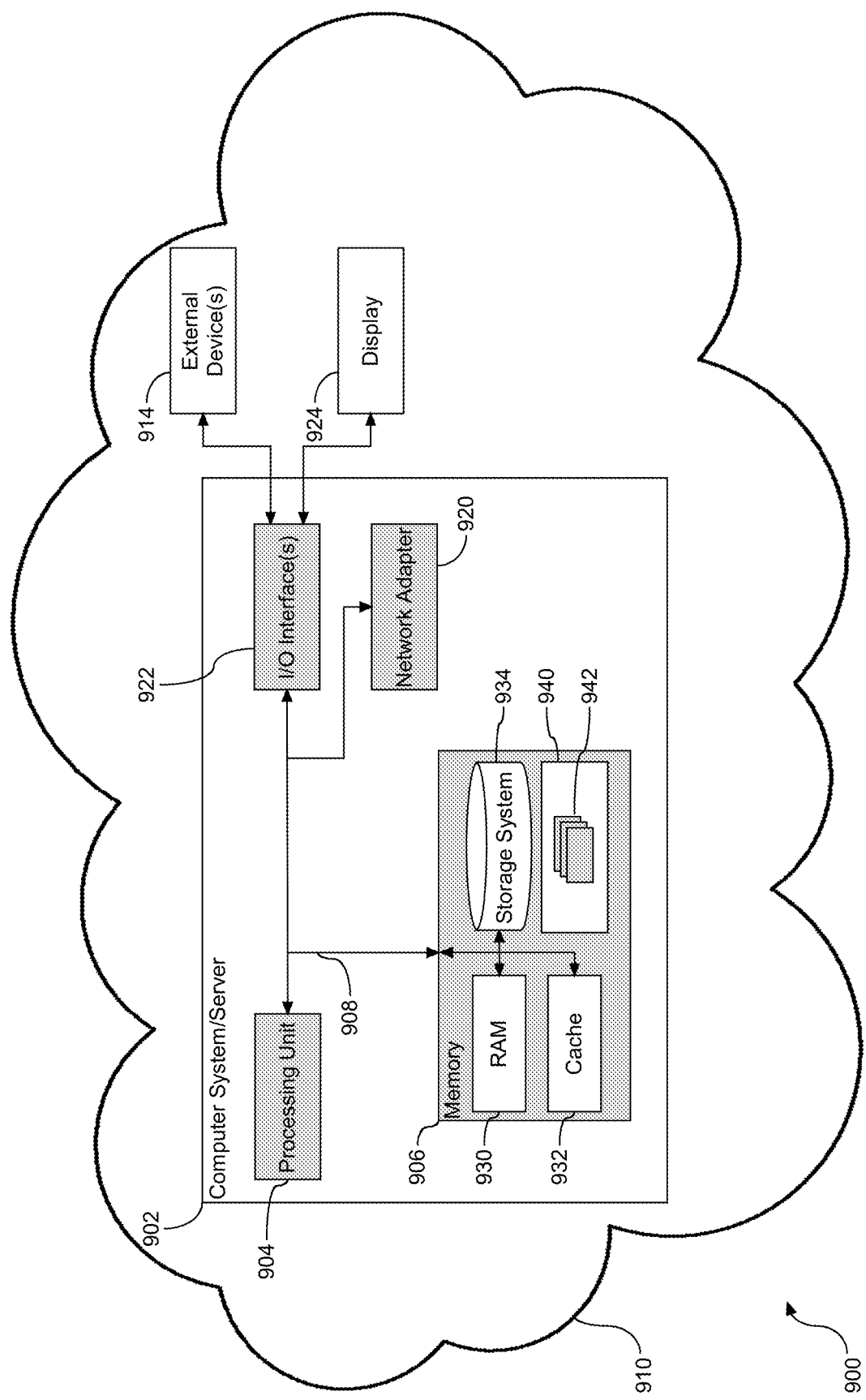
FIG. 9 is a block diagram depicting an example of a computer system/server of a cloud based support system, to implement the system and processes described above with respect to FIGS. 1-8.

Embodiments shown and described herein may be in the form of a computer system for use with an AI platform for providing and machine learning directed at orchestrating a multi-objective optimization of a cloud application. Aspects of the tools (152), (154), and (156) and their associated functionality may be embodied in a computer system/server in a single location, or in an embodiment, may be configured in a cloud based system sharing computing resources. With reference to FIG. 9, a block diagram (900) is provided illustrating an example of a computer system/server (902), hereinafter referred to as a host (902) in communication with a cloud based support system, to implement the system and processes described above with respect to FIGS. 1-8. Host (902) is operational with numerous other general purpose or special purpose computing system environments or configurations. Examples of well-known computing systems, environments, and/or configurations that may be suitable for use with host (902) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host (902) may be described in the general context of computer system-executable instructions, such as program modules, being executed by a computer system. Generally, program modules may include routines, programs, objects, components, logic, data structures, and so on that perform particular tasks or implement particular abstract data types. Host (902) may be practiced in distributed cloud computing environments (910) where tasks are performed by remote processing devices that are linked through a communications network. In a distributed cloud computing environment, program modules may be located in both local and remote computer system storage media including memory storage devices.

As shown in FIG. 9, host (902) is shown in the form of a general-purpose computing device. The components of host (902) may include, but are not limited to, one or more processors or processing units (904), a system memory (906), and a bus (908) that couples various system components including system memory (906) to processor (904). Bus (908) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (902) typically includes a variety of computer system readable media. Such media may be any available media that is accessible by host (902) and it includes both volatile and non-volatile media, removable and non-removable media.

Memory (906) can include computer system readable media in the form of volatile memory, such as random access memory (RAM) (930) and/or cache memory (932). By way of example only, storage system (934) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (908) by one or more data media interfaces.

Program/utility (940), having a set (at least one) of program modules (942), may be stored in memory (906) by way of example, and not limitation, as well as an operating system, one or more application programs, other program modules, and program data. Each of the operating systems, one or more application programs, other program modules, and program data or some combination thereof, may include an implementation of a networking environment. Program modules (942) generally carry out the functions and/or methodologies of embodiments of the adversarial training and dynamic classification model evolution. For example, the set of program modules (942) may include the modules configured as the tools (152), (154), and (156) described in FIG. 1.

Host (902) may also communicate with one or more external devices (914), such as a keyboard, a pointing device, a sensory input device, a sensory output device, etc.; a display (924); one or more devices that enable a user to interact with host (902); and/or any devices (e.g., network card, modem, etc.) that enable host (902) to communicate with one or more other computing devices. Such communication can occur via Input/Output (I/O) interface(s) (922). Still yet, host (902) can communicate with one or more networks such as a local area network (LAN), a general wide area network (WAN), and/or a public network (e.g., the Internet) via network adapter (920). As depicted, network adapter (920) communicates with the other components of host (902) via bus (908). In an embodiment, a plurality of nodes of a distributed file system (not shown) is in communication with the host (902) via the I/O interface (922) or via the network adapter (920). It should be understood that although not shown, other hardware and/or software components could be used in conjunction with host (902). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (906), including RAM (930), cache (932), and storage system (934), such as a removable storage drive and a hard disk installed in a hard disk drive.

Computer programs (also called computer control logic) are stored in memory (906). Computer programs may also be received via a communication interface, such as network adapter (920). Such computer programs, when run, enable the computer system to perform the features of the present embodiments as discussed herein. In particular, the computer programs, when run, enable the processing unit (904) to perform the features of the computer system. Accordingly, such computer programs represent controllers of the computer system.

In an embodiment, host (902) is a node of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher layer of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some layer of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 10:
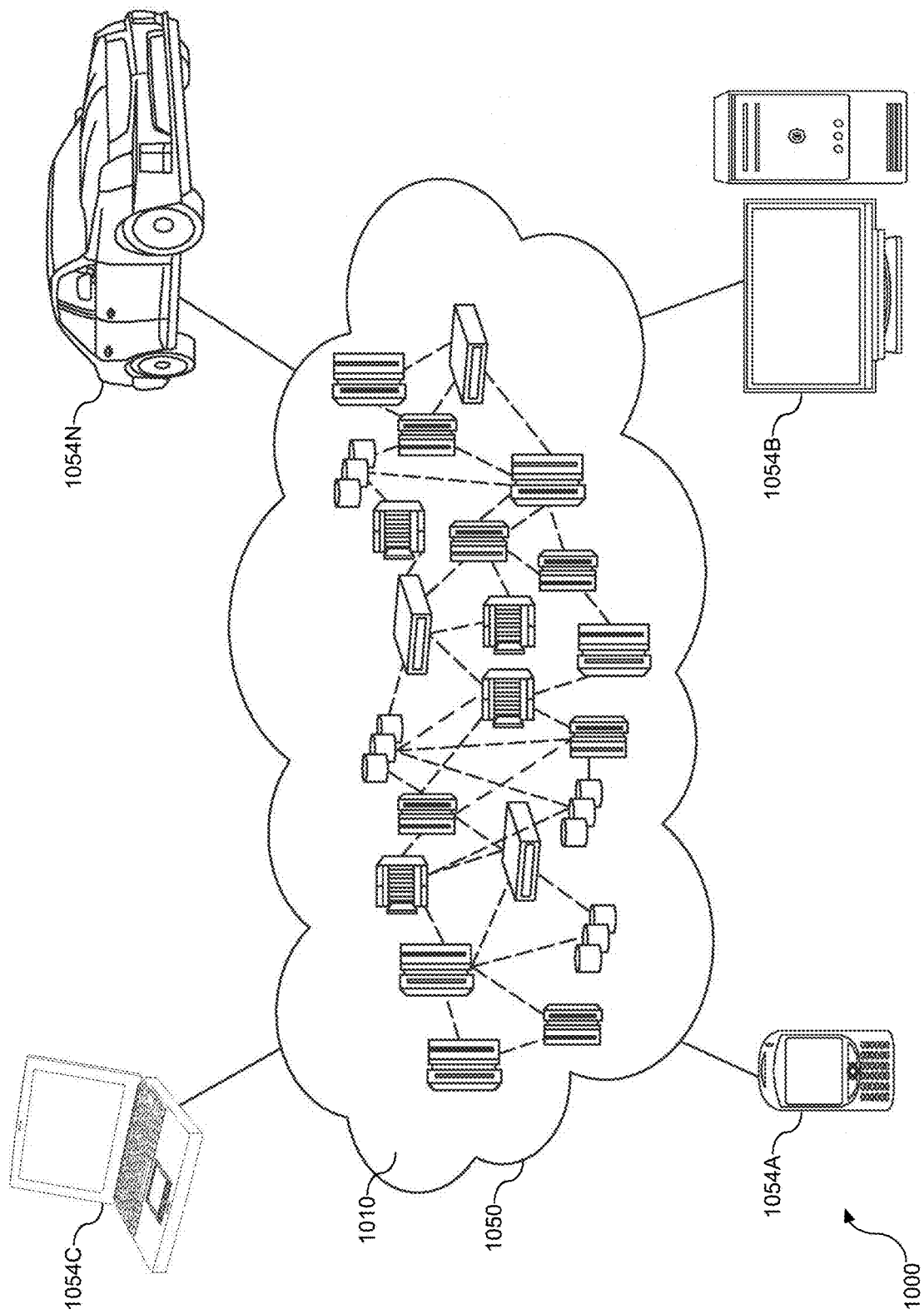
FIG. 10 depicts a block diagram illustrating a cloud computer environment.

Referring now to FIG. 10, an illustrative cloud computing network (1000). As shown, cloud computing network (1000) includes a cloud computing environment (1050) having one or more cloud computing nodes (1010) with which local computing devices used by cloud consumers may communicate. Examples of these local computing devices include, but are not limited to, personal digital assistant (PDA) or cellular telephone (1054A), desktop computer (1054B), laptop computer (1054C), and/or automobile computer system (1054N). Individual nodes within nodes (1010) may further communicate with one another. They may be grouped (not shown) physically or virtually, in one or more networks, such as Private, Community, Public, or Hybrid clouds as described hereinabove, or a combination thereof. This allows cloud computing environment (1000) to offer infrastructure, platforms and/or software as services for which a cloud consumer does not need to maintain resources on a local computing device. It is understood that the types of computing devices (1054A-N) shown in FIG. 10 are intended to be illustrative only and that the cloud computing environment (1050) can communicate with any type of computerized device over any type of network and/or network addressable connection (e.g., using a web browser).

Figure 11:
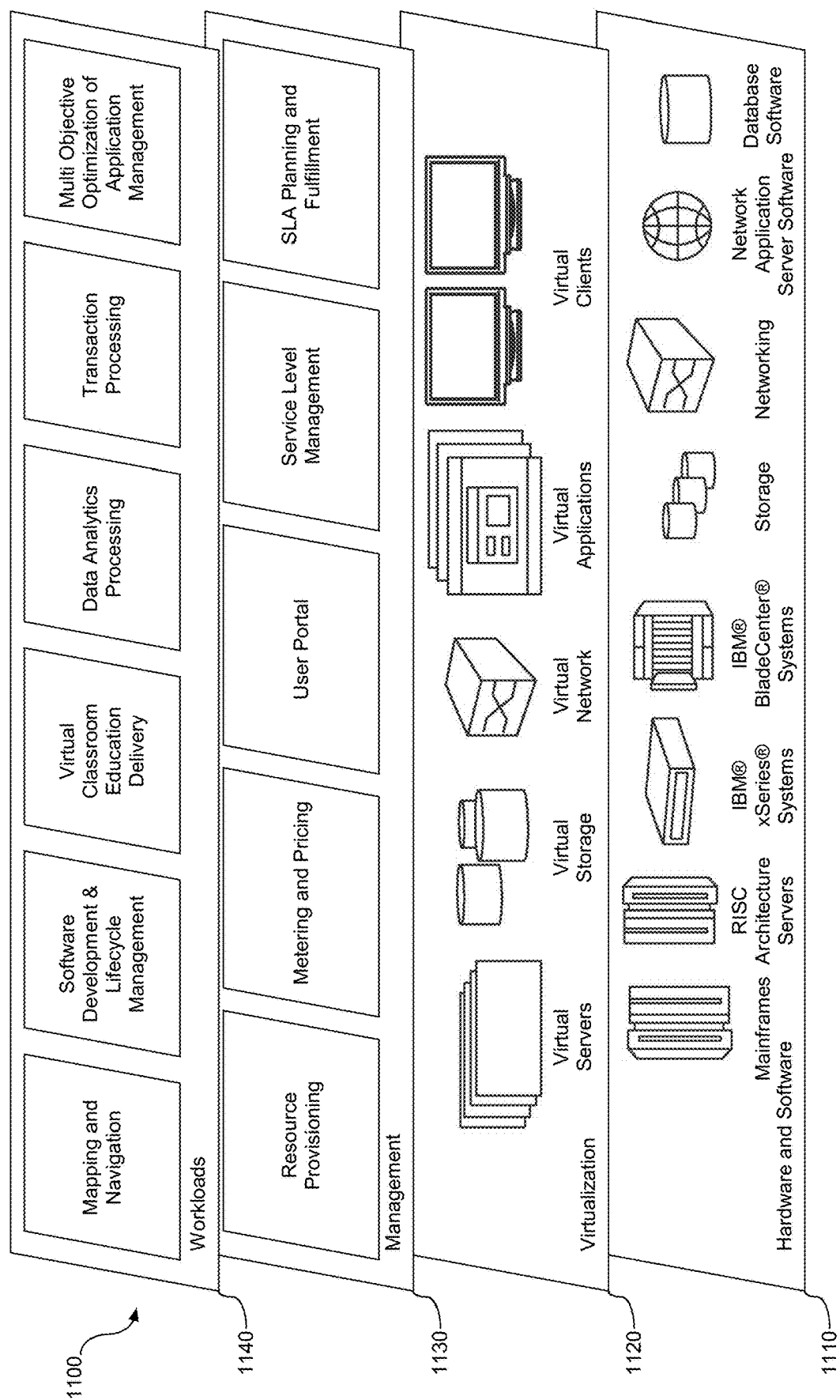
FIG. 11 depicts a block diagram illustrating a set of functional abstraction model layers provided by the cloud computing environment.

Referring now to FIG. 11, a set of functional abstraction layers (1100) provided by the cloud computing network of FIG. 10 is shown. It should be understood in advance that the components, layers, and functions shown in FIG. 11 are intended to be illustrative only, and the embodiments are not limited thereto. As depicted, the following layers and corresponding functions are provided: hardware and software layer (1110), virtualization layer (1120), management layer (1130), and workload layer (1140). The hardware and software layer (1110) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (1120) provides an abstraction layer from which the following examples of virtual entities may be provided: virtual servers; virtual storage; virtual networks, including virtual private networks; virtual applications and operating systems; and virtual clients.

In one example, management layer (1130) may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides prearrangement for, and procurement of, cloud computing resources for which a future requirement is anticipated in accordance with an SLA.

Workloads layer (1140) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and multi objective optimization of application management.

The system and flow charts shown herein may also be in the form of a computer program device for dynamically orchestrating a prerequisite driven codified infrastructure. The device has program code embodied therewith. The program code is executable by a processing unit to support the described functionality.

While particular embodiments have been shown and described, it will be obvious to those skilled in the art that, based upon the teachings herein, changes and modifications may be made without departing from its broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to the embodiments containing only one such element, even when the same claim includes the introductory phrases "one or more" or "at least one" and indefinite articles such as "a" or "an"; the same holds true for the use in the claims of definite articles.

The present embodiment(s) may be a system, a method, and/or a computer program product. In addition, selected aspects of the present embodiment(s) may take the form of an entirely hardware embodiment, an entirely software embodiment (including firmware, resident software, microcode, etc.) or an embodiment combining software and/or hardware aspects that may all generally be referred to herein as a "circuit," "module" or "system." Furthermore, aspects of the present embodiment(s) may take the form of computer program product embodied in a computer readable storage medium (or media) having computer readable program instructions thereon for causing a processor to carry out aspects of the present embodiment(s). Thus embodied, the disclosed system, a method, and/or a computer program product are operative to improve the functionality and operation of multi objective optimization of applications.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiment(s) may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiment(s).

Aspects of the present embodiment(s) are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present embodiment(s). In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments have been described herein for purposes of illustration, various modifications may be made without departing from the spirit and scope of the embodiment(s). In particular, the codified infrastructure, including the dynamic orchestration of a prerequisite driven codified infrastructure may be carried out by different computing platforms or across multiple devices. Furthermore, the data storage and/or corpus may be localized, remote, or spread across multiple systems. Accordingly, the scope of protection of the embodiment(s) is limited only by the following claims and their equivalents.

What is claimed is:

1. A computer system comprising:
a processing unit operatively coupled to memory;
the processing unit operatively coupled with an artificial intelligence (AI) platform to orchestrate a multi-objective optimization of a cloud application, the AI platform comprising:
an input manager to receive a set of two or more key performance indicators (KPIs) associated with the application, each KPI in the set of KPIs associated with a KPI value;
a trial manager to leverage a machine learning (ML) based surrogate function learning model in combination with an acquisition function to conduct an adaptive trial execution of the application with one or more parameters associated with one or more topological constraints, wherein the one or more topological constraints include a hierarchical arrangement of micro-services;
the trial manager to observe output from each trial execution and to compute a pareto surface of the observed output;
an optimization manager to explore the computed pareto surface and select an optimal application operating point corresponding to configuration of the one or more parameters; and
the optimization manager to execute the application at the selected optimal operating point.

2. The computer system of claim 1, wherein the ML based surrogate function learning model maps each configuration of the one or more parameters to the two or more KPI values.

3. The computer system of claim 2, wherein the ML based surrogate function learning model is implemented using a neural network, Gaussian Progress regression, kernel regression techniques, or a combination thereof.

4. The computer system of claim 1, wherein the acquisition function selects a second configuration of one or more second parameters for a second trial execution of the application.

5. The computer system of claim 4, where the acquisition function is implemented as an expected improvement function, maximum probability of improvement function, upper confidence bound function, or a combination thereof.

6. The computer system of claim 1, wherein the set of two or more KPI values comprises latency, error rate, throughput, or a combination thereof, and wherein the one or more parameters associated with the one or more topological constraints comprises timeout, retry, replication count, or a combination thereof.

7. The computer system of claim 6, wherein the hierarchical arrangement of micro-services and the one or more parameters are set with respect to a hierarchy, including ensuring that the one or more parameters guarantees a query from a parent micro-service in the hierarchy is active as long as one or more queries from a child micro-service is active.

8. A computer program product to orchestrate a multi objective optimization of cloud applications, the computer program product comprising a computer readable storage medium having program code embodied therewith, the program code executable by a processor to:

receive a set of two or more key performance indicators (KPIs) associated with an application, each KPI in the set of KPIs associated with a KPI value;

leverage a machine learning (ML) based surrogate function learning model in combination with an acquisition function to conduct an adaptive trial execution of the application with one or more received parameters associated with one or more topological constraints, wherein the one or more topological constraints include a hierarchical arrangement of micro-services;

observe output from each trial execution and compute a pareto surface of the observed output;

explore the computed pareto surface and select an optimal application operating point corresponding to configuration of the one or more parameters; and execute the application at the selected optimal operating point.

9. The computer program product of claim 8, wherein the ML based surrogate function learning model maps each configuration of the one or more parameters to the two or more KPI values.

10. The computer program product of claim 9, wherein the ML based surrogate function learning model is implemented using a neural network, Gaussian Progress regression, kernel regression techniques, or learning combination thereof.

11. The computer program product of claim 8, wherein the acquisition function selects a second configuration of one or more second parameters for a second trial execution of the application.

12. The computer program product of claim 11, where the acquisition function is implemented as an expected improvement function, maximum probability of improvement function, upper confidence bound function, or a combination thereof.

13. The computer program product of claim 8, wherein the set of two or more KPI values comprises latency, error rate, throughput, or a combination thereof, and wherein the one or more parameters associated with the one or more topological constraints comprises timeout, retry, replication count, or a combination thereof.

14. The computer program product of claim 13, wherein the hierarchical arrangement of micro-services and the one or more parameters are set with respect to a hierarchy, including ensuring that the one or more parameters guarantees a query from a parent micro-service in the hierarchy is active as long as one or more queries from a child micro-service is active.

15. A computer implemented method comprising:

receiving a set of two or more key performance indicators (KPIs) associated with an application, each KPI in the set of KPIs associated with a KPI value;

leveraging a machine learning (ML) based surrogate function learning model in combination with an acquisition function to conduct an adaptive trial execution of the application with one or more received parameters associated with one or more topological constraints, wherein the one or more topological constraints include a hierarchical arrangement of micro-services;

observing output from each trial execution and computing a pareto surface of the observed output;

exploring the computed pareto surface and selecting an optimal application operating point corresponding to configuration of the one or more parameters; and executing the application at the selected optimal operating point.

16. The method of claim 15, wherein the ML based surrogate function learning model maps each configuration of the one or more parameters to the two or more KPI values.

17. The method of claim 16, wherein the ML based surrogate function learning model is implemented using a neural network, Gaussian Progress regression, kernel regression techniques, or a combination thereof.

18. The method of claim 15, wherein the acquisition function selects a second configuration of one or more second parameters for a second trial execution of the application.

19. The method of claim 18, where the acquisition function is implemented as an expected improvement function, maximum probability of improvement function, upper confidence bound function, or a combination thereof.

20. The method of claim 15, wherein the set of two or more KPI values comprises latency, error rate, throughput, or a combination thereof, and wherein the one or more parameters associated with the one or more topological constraints comprises timeout, retry, replication count, or a combination thereof.

* * * * *